United States Patent [19]
Lazzari

[11] Patent Number: 5,504,643
[45] Date of Patent: Apr. 2, 1996

[54] MAGNETIC READ/WRITE HEAD HAVING A WRITING-COMPENSATED MAGNETORESISTANT ELEMENT

[75] Inventor: Jean-Pierre Lazzari, Corenc, France

[73] Assignees: Commissariat a l'Energie Atomique, Paris; SILMAG, Grenoble, both of France

[21] Appl. No.: 297,815

[22] Filed: Aug. 30, 1994

[30] Foreign Application Priority Data

Sep. 6, 1993 [FR] France ................. 93 10560

[51] Int. Cl.$^6$ .............. G11B 5/127; G11B 5/33
[52] U.S. Cl. ................................................. 360/113
[58] Field of Search ............................ 360/113

[56] References Cited

U.S. PATENT DOCUMENTS

| | | |
|---|---|---|
| Re. 33,383 | 10/1990 | Lazzari . |
| 2,975,241 | 3/1961 | Camras et al. ............. 179/100.2 |
| 3,670,114 | 6/1972 | Johnson et al. ............. 179/100.2 C |
| 4,639,289 | 1/1987 | Lazzari . |
| 4,684,438 | 8/1987 | Lazzari . |
| 4,689,708 | 8/1987 | Hager et al. . |
| 4,731,157 | 3/1988 | Lazzari . |
| 4,809,103 | 2/1989 | Lazzari . |
| 4,837,924 | 6/1989 | Lazzari . |
| 4,901,177 | 2/1990 | Lazzari . |
| 4,949,207 | 8/1990 | Lazzari . |
| 5,090,111 | 2/1992 | Lazzari . |
| 5,166,849 | 11/1992 | Fedeli ........................... 360/112 |
| 5,168,408 | 12/1992 | Lazzari ......................... 360/113 |
| 5,196,976 | 3/1993 | Lazzari . |
| 5,208,716 | 5/1993 | Lazari . |
| 5,274,521 | 12/1993 | Miyauchi et al. ............ 360/119 |

FOREIGN PATENT DOCUMENTS

| | | |
|---|---|---|
| 0475397 | 3/1992 | European Pat. Off. . |
| WO88/07741 | 10/1988 | WIPO . |

*Primary Examiner*—Robert S. Tupper
*Assistant Examiner*—Adriana Giordana
*Attorney, Agent, or Firm*—Oblon, Spivak, McClelland, Maier & Neustadt

[57] ABSTRACT

Magnetic read/write head having a writing-compensated magneto-resistant element.

In the invention, the head includes, beneath a magnetoresistant element (MR), a conductor element (40) and preferably an additional magnetic layer (44) perforated by an opening (46). The conductor element (40) is in series with the writing coil and connected in such a way that, in the magnetoresistant element, the magnetic field resulting from the passage of the current in the conductor element opposes the writing leakage field.

7 Claims, 5 Drawing Sheets

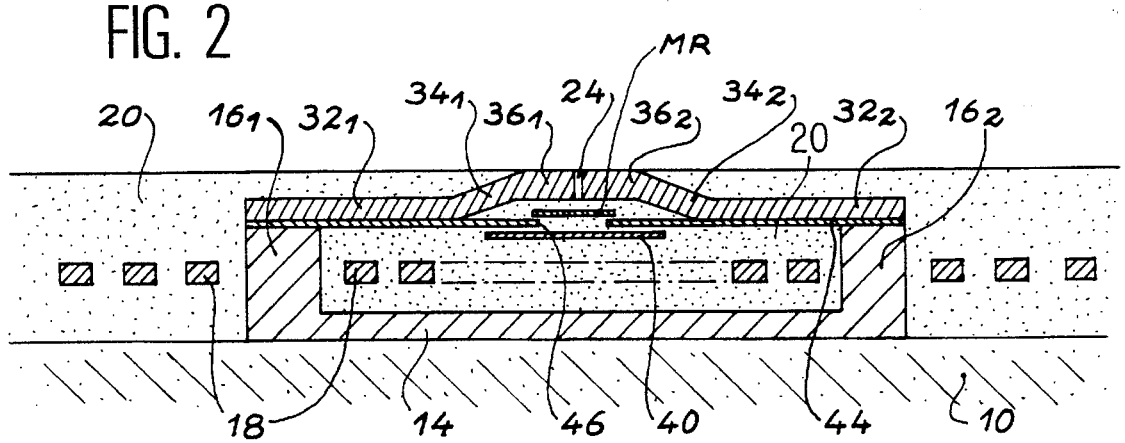
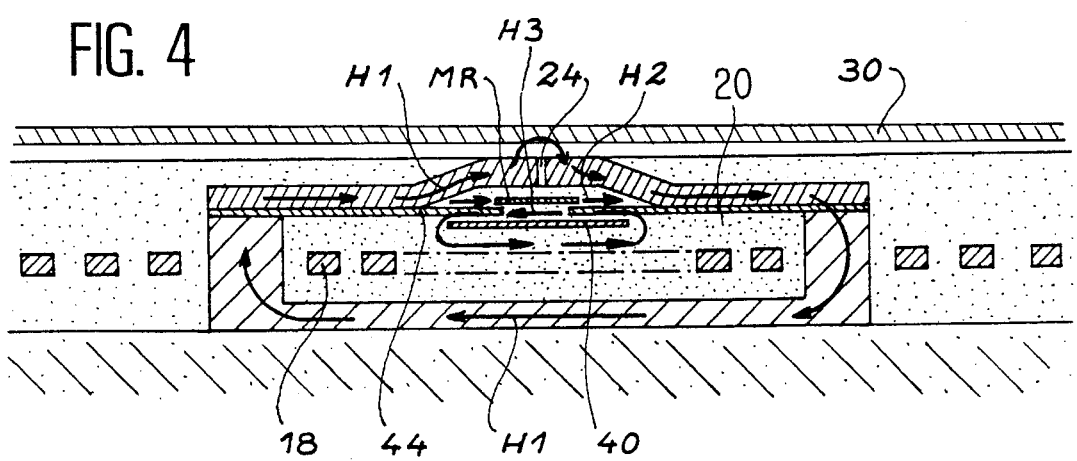
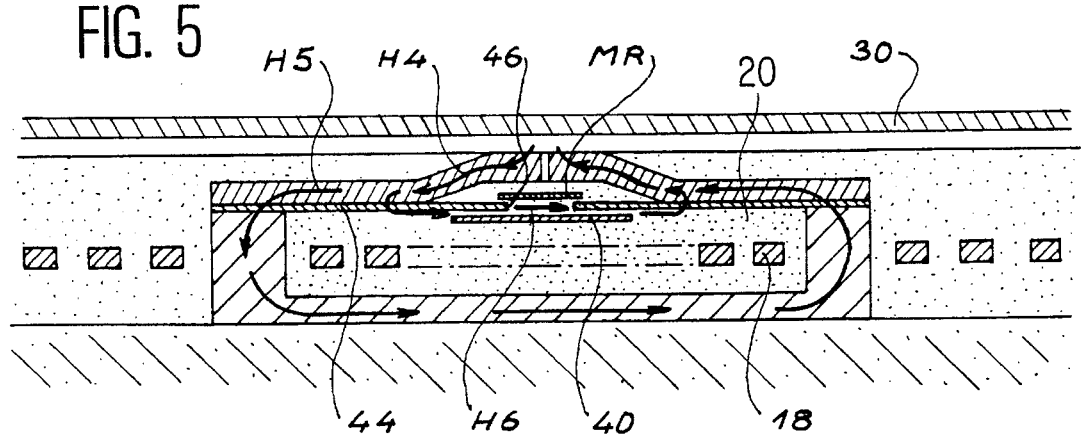

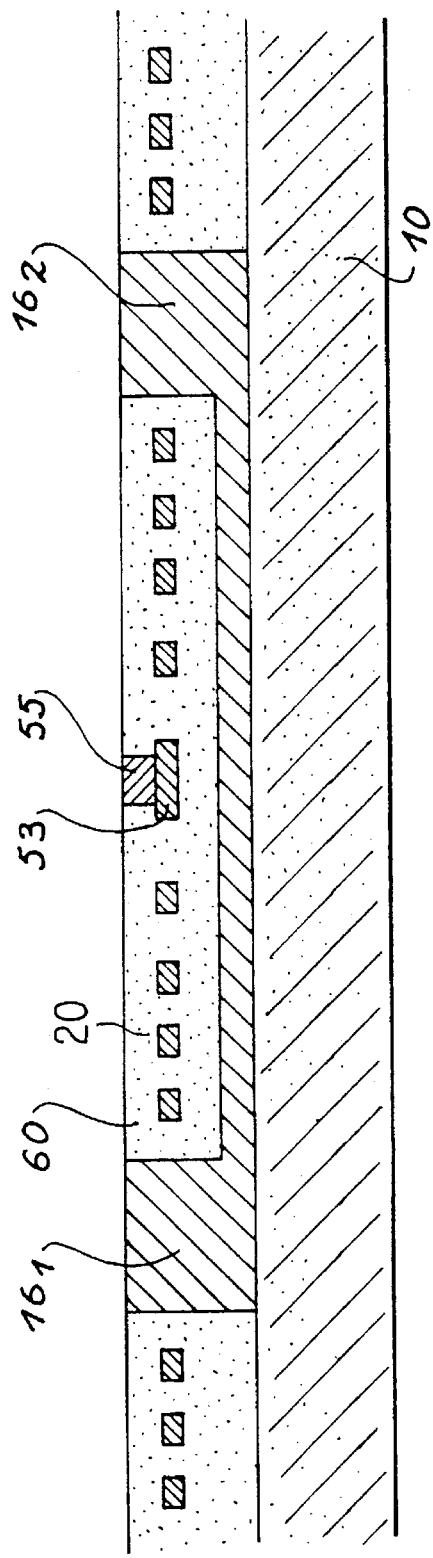
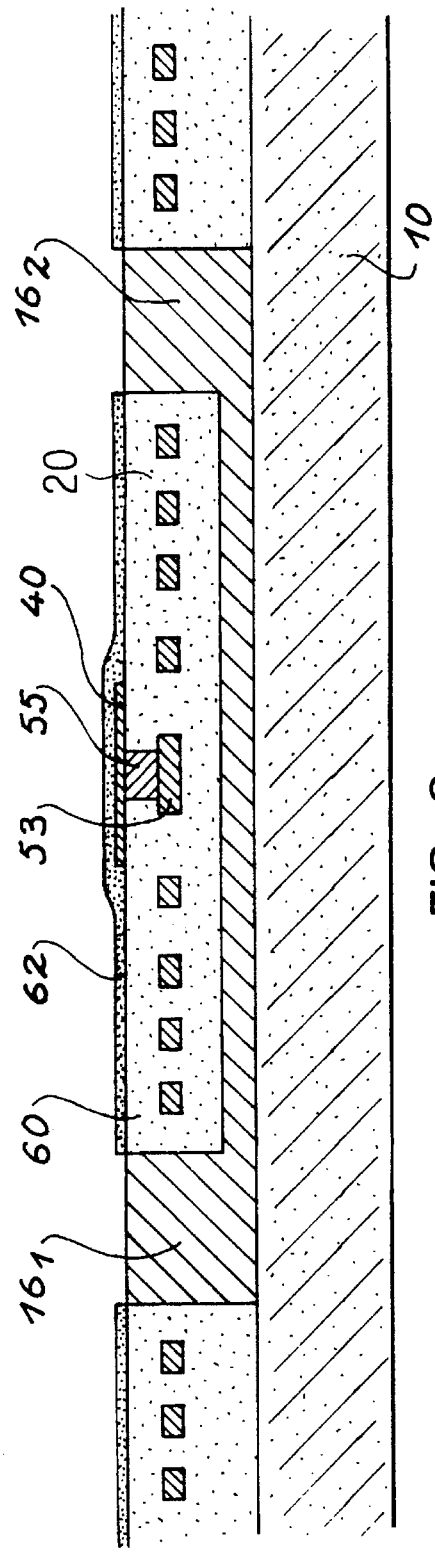

MAGNETIC READ/WRITE HEAD HAVING A WRITING-COMPENSATED MAGNETORESISTANT ELEMENT

DESCRIPTION

1. Technical Field

The present invention relates to a magnetic read/write head having a writing-compensated magnetoresistant element. It is used in magnetic information recording.

2. Prior Art

Magnetic read/write heads are known, which use as the reading means a magnetoresistant element. In the early devices of this type, the magnetoresistant element was placed in the head gap of the magnetic circuit of the head.

Although such heads are simple and inexpensive, they still suffer from disadvantages. Thus, the writing field produces in the magnetoresistant element a very high field, which saturates said element in the direction of the field. If it is then wished to use this head in reading, it is necessary to wait for the magnetic zones of the magnetoresistant layer to have returned precisely in the initial orientation appropriate for reading, i.e. in general 45° from the axis of the element.

However, certain zones which are excessively disturbed by the writing field never return to this ideal position, so that undesired noise disturbs the reading signal.

One solution to this problem consists of using two heads, one for writing and the other for reading and only the reading head has a magnetoresistant element. Thus, said element is never subject to high fields and therefore has an extremely stable zone structure.

However, this technology is complex and expensive. Moreover, the presence of two separate head gaps complicates the problem of positioning the head along the recording tracks, particularly when the recording support is a disk and the tracks are curved.

Therefore the invention does not adopt this solution and returns to heads having a single head gap, but in a particular, so-called horizontal structure with thin layers or films. Such heads are known and described in FR-A-2,645,314 (or the corresponding U.S. Pat. No. 5,208,716). A head of this type is described relative to the attached FIG. 1.

FIG. 1 shows in section a horizontal head having a semiconductor substrate 10, e.g. of silicon, in which has been etched a recess 12. In said recess a lower magnetic layer 14 is electrolytically formed and is extended by two vertical posts $16_1$, $16_2$, which are surrounded by a conductor coil 18. This coil is embedded in an insulating layer 20. The magnetic circuit is completed by an upper pole piece subdivided into two parts $22_1$, $22_2$ by an amagnetic spacer 24. A magnetoresistant element MR, e.g. of iron-nickel is placed beneath the amagnetic spacer 24. This element can be obtained by photoetching using the spacer as the mask and is consequently self-aligned with respect to the spacer. The head moves in front of a magnetic support 30, where are recorded the informations to be read or written.

The operation of such a head is as follows. On writing, the current flowing in the coil 18 creates a magnetic field and consequently an induction in the magnetic circuit. The field lines open out around the spacer inducing a magnetization in the support 30.

On reading, a magnetic information recorded in the support 30 produces a magnetic reading field and consequently an induction in the magnetic circuit. This induction is partly closed across the magnetoresistant element MR. This leads to a magnetization in said element, which gives rise to a variation of its resistance. By making a current flow in said element, it is possible to measure its resistance variation and consequently retrieve the information read.

Although satisfactory in certain respects, such heads suffer from a disadvantage once again associated with a disturbance to the magnetoresistant element during writing, as a result of the leakage field passing through said element. Although reduced compared with heads where the magnetoresistant element was located in the head gap, this disturbing phenomenon persists. It is the aim of the invention to reduce or cancel out this phenomenon.

SUMMARY OF THE INVENTION

To this end, the invention proposes placing beneath and in the vicinity of a magnetoresistant element, a conductor element traversed by the writing current. This current will create around it an additional magnetic field, which will pass through the magnetoresistant element. If the connection direction is correct, this additional field will oppose the writing leakage field. Therefore this additional field will act like a compensating field and will reduce or cancel out the overall magnetic field in the magnetoresistant element in the writing phase.

More specifically, the present invention consequently relates to a magnetic read/write head having a magnetic circuit with a head gap, a magnetoresistant element located beneath the head gap and a conductor coil surrounding part of the magnetic circuit, said coil being traversed by an electric current during a writing phase, said current creating a writing magnetic field in the magnetic circuit, part of said writing field, known as the leakage field, traversing the magnetoresistant element, said head being characterized in that it also comprises an electrical conductor element placed beneath the magnetoresistant element and connected in series with the conductor coil in a direction such that, in writing, the current flowing in said conductor element produces in the magnetoresistant element a magnetic field in the opposite direction to the leakage field passing through the magnetoresistant element.

In an advantageous variant, the head according to the invention comprises an additional magnetic layer connected to the magnetic circuit and having an opening positioned between the magnetoresistant element and the electrical conductor element. This additional layer makes it possible to optimize the efficiency of the head on reading.

In an advantageous embodiment, the opening of the thin magnetic layer or film has a width substantially equal to or smaller than the width of the magnetoresistant element.

BRIEF DESCRIPTION OF THE DRAWINGS

FIG. 2 shows in section a magnetic head according to the invention.

FIG. 4 diagrammatically shows the magnetic field lines in writing.

FIG. 5 diagrammatically shows the magnetic field lines in reading.

FIG. 7 shows a second subassembly along a second sectional plane passing through one of the connectors of the conductor element.

FIG. 8 shows in section a third subassembly completed by the conductor element connected to the coil.

DETAILED DESCRIPTION OF EMBODIMENTS

Figure 1:
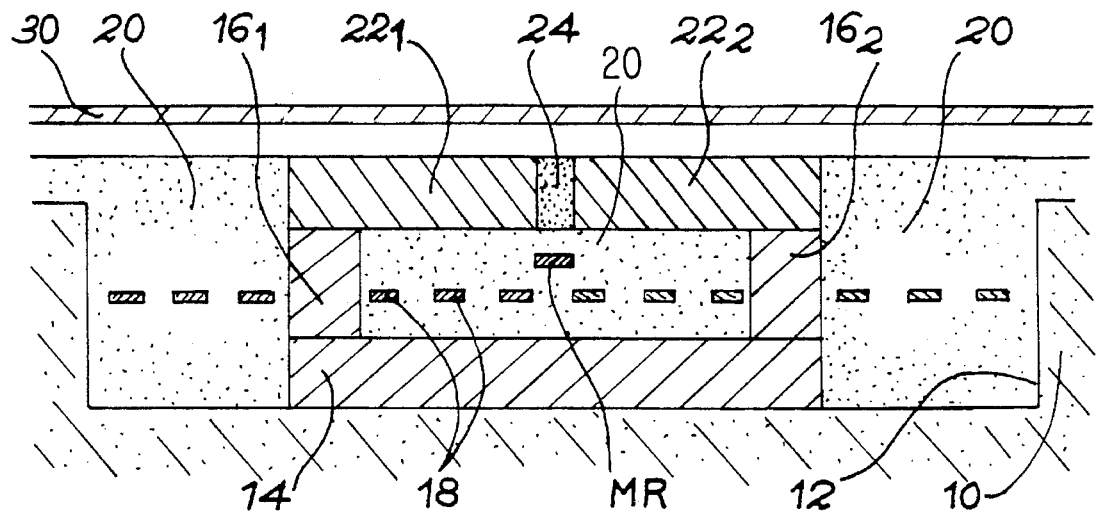
FIG. 1, already described, shows a magnetic head having a magnetoresistant element according to the prior art.

FIG. 2 shows a magnetic read/write head according to the invention. The elements already shown in FIG. 1 carry the same references. The head also comprises a conductor element 40, e.g. of copper, connected to the coil 18 (as can best be seen in FIG. 3) and an additional magnetic layer 44 having an opening or head gap 46. The width of said opening is substantially equal to or smaller than that of the magnetoresistant element MR, but the width of the conductor element 40 is greater than that of said magnetoresistant element. The magnetic layer 44 can have a thickness between approximately 0.1 μm and approximately 5 μm. The conductor element 40 can be at a distance between approximately 0.1 and 1 μm from the magnetic layer 44.

In addition, the upper magnetic layer of the magnetic circuit is formed from three double portions, one $32_1$, $32_2$ being horizontal and in contact with the additional layer 44, another $34_1$, $34_2$, which is slightly inclined and freeing the additional layer 44 around its opening 46, and a third, which is once again horizontal, $36_1$, $36_2$ on each side of the spacer 24. However, this only constitutes a non-limitative embodiment.

Figure 3:
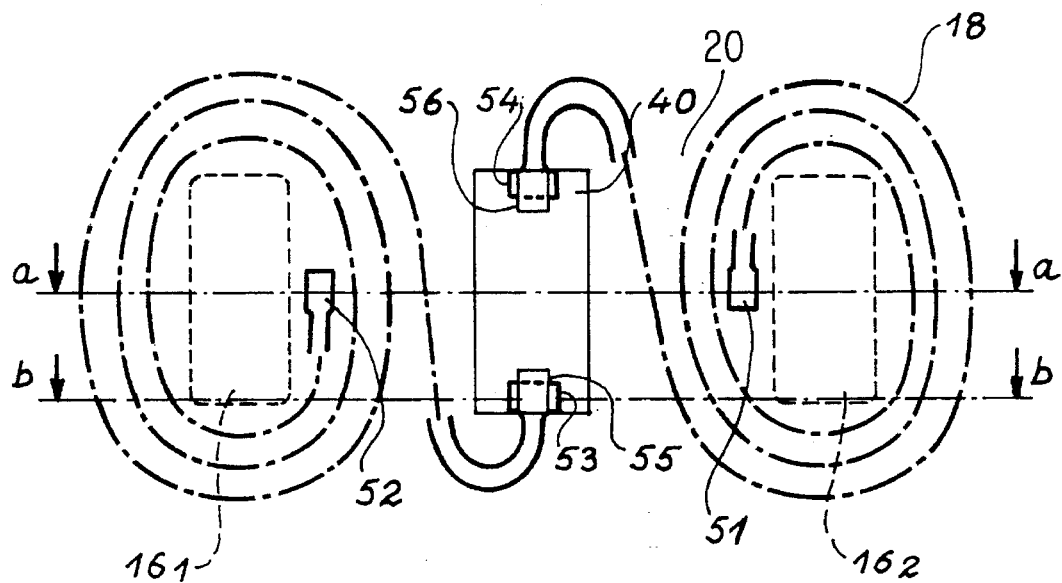
FIG. 3 illustrates the electrical connection between the conductor element placed beneath the magnetoresistant element and the conductor coil.

FIG. 3 shows in plan view a conductor coil 18 in double spiral form surrounding the two magnetic posts $16_1$, $16_2$. Two conductor elements 51,52 make it possible to connect the winding to any supply means. The coil 18 is terminated at two ends 53,54 located in the median plane of the head. These two ends lead to two connectors 55,56 making it possible to connect the conductor element 40. The writing current passing through the conductor or winding 18 consequently passes integrally into the conductor element 40. The connection direction thereof can be referred to as "in opposition", to the extent that the direction of the current in the element 40 is such that the additional magnetic field resulting therefrom above the element is in the opposite direction to the magnetic field channelled by the magnetic circuit and resulting from the flow of the current in the coil 18. Thus, it is under this condition that the additional magnetic field can compensate the leakage field upon writing.

FIGS. 4 and 5 provide a better understanding of the head according to the invention.

Firstly, FIG. 4 corresponds to operation in writing. It is possible to see the writing field H1 channelled by the magnetic circuit, with a portion H2 constituting a leakage field, channelled by the additional layer 44 and straddling the opening 46 serving as the head gap. The field H3 resulting from the flow of the current in the element 40 (perpendicular to the plane of the drawing) is opposed to H2. The resultant is zero if the head is well dimensioned or, in any case, smaller than the field H2.

FIG. 5 illustrates the operation of the head in reading. The field H4 is created by the information to be read. It is partly closed along field H5 by the magnetic circuit and partly by the field H6 channelled by the additional magnetic layer 44. As a result of the opening 46 serving as a head gap, said field H6 passes into the magnetoresistant element MR and gives access to the information read.

FIGS. 6 to 10 illustrate different stages of a process for the production of the head described hereinbefore. Numerous operations have already been described in the aforementioned FR-A-2,645,314 (or the corresponding U.S. Pat. No. 5,208,716) and will consequently not be described again here. Only the operations specific to the realization of the conductor element and the additional magnetic layer will be described.

Figure 6:
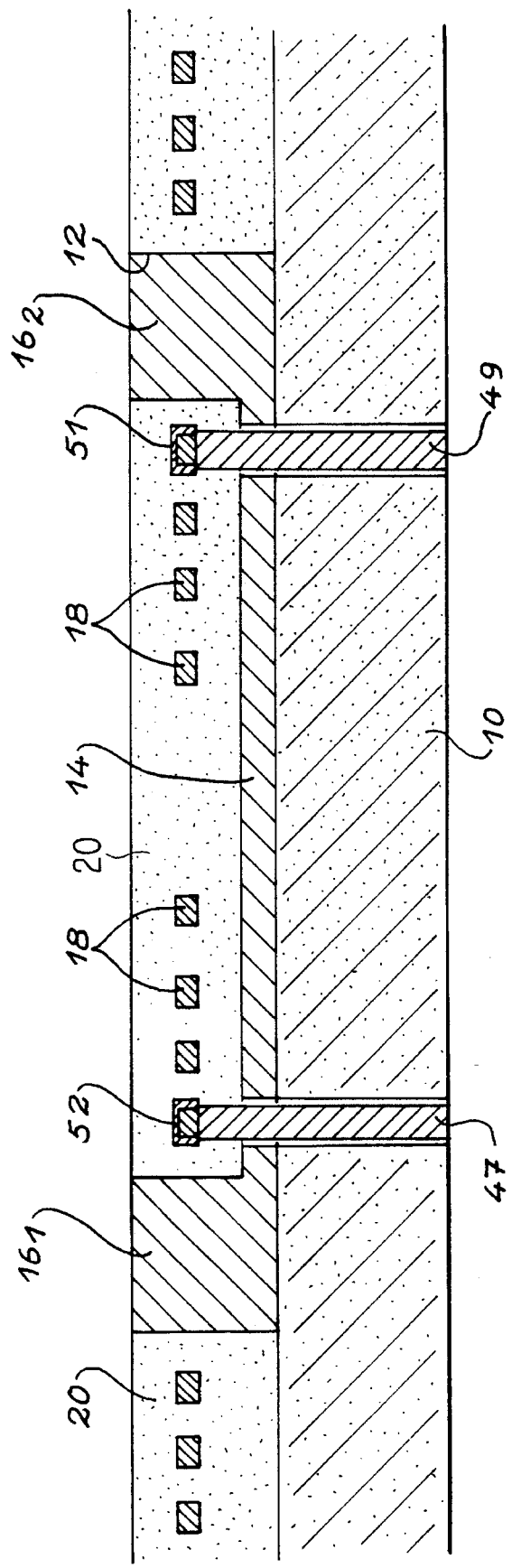
FIG. 6 shows a first subassembly along a first sectional plane passing through the centre of the coil.

As illustrated in FIG. 6, the first stage is to produce on a semiconductor substrate 10, which is e.g. of silicon, a recess 12, a lower magnetic layer 14 and two magnetic posts $16_1$, $16_2$, as described in FR-A-2,645,314. Two interconnections 47,49 are then formed through the substrate 10 and the lower magnetic layer, as well as two connectors 51,52, whose arrangement has been shown with respect to FIG. 3. Therefore FIG. 6 corresponds to a section along the line aa of FIG. 3, i.e. a section passing through connectors 51,52.

This is followed by the formation of the conductor coil 18 starting from the connectors 51,52 and winding around the posts $16_1$, $16_2$, whereby said coil can be of copper. Only a few turns are illustrated in FIG. 6 (in conjunction with FIG. 3), but in practice there can e.g. be 16 turns in the same plane, distributed in the form of twice 8 turns.

This coil or winding is terminated by two ends 53,54 located in the median plane of the head, as has been shown relative to FIG. 3. FIG. 7 corresponds to a section along the line bb of FIG. 3, i.e. a section passing through the end 53 of the coil.

On the coil 18 is deposited an insulating layer 60, which can be approximately 2 μm thick silica ($SiO_2$). This is followed by photolithography and then reactive ionic etching in order to etch said layer perpendicular to the coil ends 53,54. In the thus formed two openings are grown, e.g. by electrolysis, connectors 55,56 (only the connector 55 being visible in the section of FIG. 7), said connectors being e.g. of copper.

The copper deposit is then planarized so that the two connectors are flush with the surface of the insulating layer 60.

This is followed by the deposition, e.g. by cathodic sputtering, of a thin conductive layer or film, e.g. of copper. There is a photolithography followed by an etching process, so as to only leave a small plate or wafer forming the conductor element 40. The two ends of said element rest on connectors 55,56. FIG. 8 shows the conductor element in section at its end resting on the connector 55. The width of the conductor element 40 can be between approximately 1 and 15 μm, whilst its length can be approximately 3 to 15 μm.

A thin insulating layer 62, e.g. of silica ($SiO_2$) can then be deposited on the assembly and cathodic sputtering can be used. The thickness of said layer can be approximately 0.05 to 3 μm, the layer covering the conductor element 40.

Figure 9:
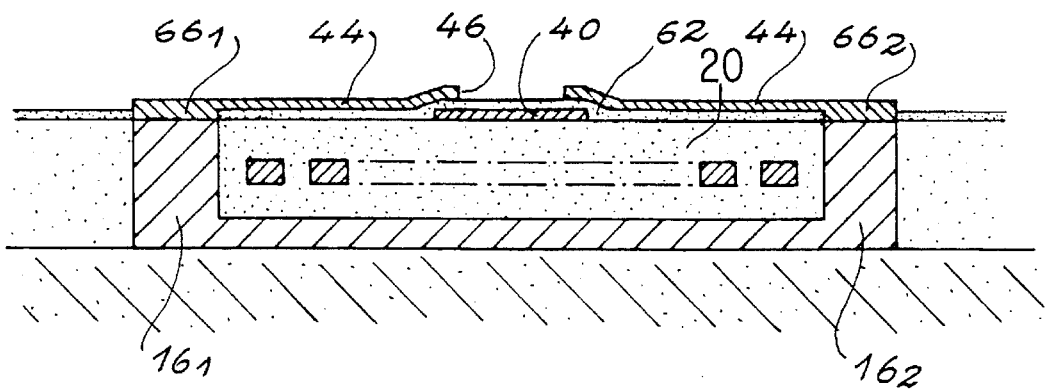
FIG. 9 shows in section a fourth subassembly completed by the additional magnetic field.
Figure 10:
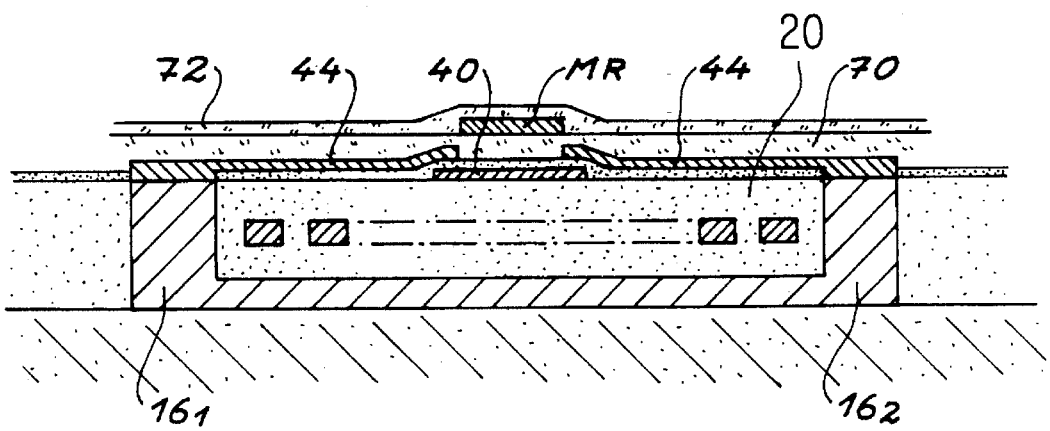
FIG. 10 shows in section a fifth subassembly incorporating the magnetoresistant element.

By photolithography followed by reactive ionic etching two openings $66_1$, $66_2$ are formed in said layer 62 above the two magnetic posts $16_1,16_2$, on either side of the head, in order to free the latter (FIG. 9).

This is followed by the deposition of an e.g. iron-nickel, magnetic layer 44. It is e.g. possible to use cathodic sputtering. The thickness of said layer can be between approximately 0.1 and 5 μm.

By photolithography followed by etching, an opening 46 is made in the centre of the magnetic layer 44. The width of said opening is approximately the same or smaller than that of the future magnetoresistant element and can e.g. be approximately 1 to 6 µm.

This is followed by the deposition on the assembly of an insulating layer 70 (FIG. 10), which is e.g. of silica ($SiO_2$). Its thickness is between approximately 0.1 and 1 µm. Then, using any known process, the magnetoresistant element MR is deposited.

An insulating layer 72 is deposited on the magnetoresistant element in order to electrically insulate it. Two interconnections are then made through the substrate 10 in order to obtain two output elements permitting the measurement of the reading voltage. The addition, according to the invention, of the conductor element 40 and the magnetic layer 44 does not lead to any increase in the number of connectors compared with a head in accordance with FR-A-2,645,314. There are still four connectors (possibly even three if two are combined).

After insulating the magnetoresistant element MR and producing the interconnections, the insulating layers 70,72 are etched above the magnetic posts, followed by the deposition of the magnetic layers $32_1$, $32_2$ and $34_1$, $34_2$, already shown in FIG. 2. The spacer 24 is then formed by means described in the prior art and in particular in FR-A-2,645,314 and finally the pole pieces $36_1$, $36_2$ are formed.

I claim:

1. A magnetic read/write head for reading and writing magnetically recorded data, comprising:

a magnetic circuit having a head gap;

a conductor coil for inducing the induced magnetic field in the magnetic circuit during a writing procedure according to data to be recorded;

a magnetoresistant element for sensing a current created by a portion of the induced magnetic field induced in the magnetic circuit by the magnetically recorded data during a reading procedure; and a conductor element connected to the conductor coil for inducing an opposing magnetic field in the magnetoresistant element opposed to a leakage magnetic field during the writing procedure.

2. A magnetic read/write head for reading and writing magnetically recorded data, comprising:

a magnetic circuit, for channeling an induced magnetic field, having a head gap where the induced magnetic field exits the magnetic circuit and is effected by the magnetically recorded data;

a conductor coil having a section enclosed by the magnetic circuit and a section outside the magnetic circuit for inducing the induced magnetic field in the magnetic circuit during a writing procedure according to data to be recorded;

a magnetoresistant element enclosed by the magnetic circuit and adjacent the head gap for sensing a current created by a portion of the induced magnetic field induced in the magnetic circuit by the magnetically recorded data during a reading procedure; and a conductor element connected to the conductor coil, positioned between the magnetoresistant element and the conductor coil and enclosed by the magnetic circuit for inducing an opposing magnetic field in the magnetoresistant element opposed to a leakage magnetic field during the writing procedure.

3. The apparatus of claim 2, wherein the magnetic circuit forms a continuous channel enclosing the conductor coil starting at the head gap and ending at the head gap.

4. The apparatus of claim 2, wherein a width of the conductor element, measured in the direction which the head gap spans the magnetic circuit, is greater than the width of the magnetoresistant element.

5. The apparatus of claim 4, wherein the magnetic circuit further comprises:

an additional magnetic layer extending from the magnetic circuit to a region between the magnetoresistant element and the conductor element and having an opening which magnetically exposes the magnetoresistant element to the conductor element.

6. The apparatus according to claim 5, wherein the additional magnetic layer has a thickness between 0.1 and 5.0 µm.

7. The apparatus according to claim 5, wherein the opening of the additional magnetic layer is equal to or smaller than the width of the magnetoresistant layer.

\* \* \* \* \*